US012110206B2

(12) United States Patent
Koyama

(10) Patent No.: US 12,110,206 B2

(45) Date of Patent: Oct. 8, 2024

(54) IMAGE FORMING APPARATUS

(71) Applicant: CANON KABUSHIKI KAISHA, Tokyo (JP)

(72) Inventor: Hiroshi Koyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 162 days.

(21) Appl. No.: 17/979,997

(22) Filed: Nov. 3, 2022

(65) Prior Publication Data

US 2023/0147199 A1 May 11, 2023

(30) Foreign Application Priority Data

Nov. 9, 2021 (JP) ................................ 2021-182381

(51) Int. Cl.

*B65H 5/06* (2006.01)
*B41J 25/316* (2006.01)
*B41J 29/02* (2006.01)

(52) U.S. Cl.

CPC .............. *B65H 5/06* (2013.01); *B41J 25/316* (2013.01); *B41J 29/02* (2013.01)

(58) Field of Classification Search

CPC .. B65H 5/06; B65H 2551/21; B65H 2801/06; B65H 29/12; B65H 29/22; B65H 29/52; B65H 31/02; B41J 25/316; B41J 29/02; B41J 3/46; B41J 13/106; B41J 29/13; G03G 21/1619; G03G 15/5016; G03G 21/1647

See application file for complete search history.

(56) References Cited

U.S. PATENT DOCUMENTS 9,527,692 B2 12/2016 Shimizu et al.

FOREIGN PATENT DOCUMENTS

EP 3279742 A1 * 2/2018 ......... G03G 15/5016
JP 2015217551 A 12/2015

OTHER PUBLICATIONS

Koyanagi, Tsuyoshi, "Image Forming Apparatus With Movable Control Panel" (EP 3 279 742 A1), Feb. 7, 2018, [Abstract, Paragraphs 0010-0016]. (Year: 2018).*

* cited by examiner

*Primary Examiner* — Lisa Solomon
(74) *Attorney, Agent, or Firm* — ROSSI, KIMMS & McDOWELL LLP

(57) ABSTRACT

An image forming apparatus includes an image forming unit, a casing, a sheet discharge unit, a sheet supporting portion, an operation unit, a supporting unit, and a regulating portion. The supporting unit supports the operation unit such that, when the display surface is tilted with respect to a horizontal direction, an end on a lower side of the operation unit is positioned below a second virtual straight line. The regulating portion is disposed between the operation unit and the sheet supporting portion in the vertical direction. The regulating portion is disposed such that at least a part of the regulating portion overlaps the operation unit and the supporting surface in a width direction. The regulating portion is disposed to intersect with the second virtual straight line. The regulating portion is configured to regulate an obliquely upward movement of a recording material discharged by the sheet discharge unit.

9 Claims, 10 Drawing Sheets

IMAGE FORMING APPARATUS

BACKGROUND OF THE INVENTION

Field of the Invention

This disclosure relates to an image forming apparatus such as a printer, a copier, a facsimile, or an integrated machine.

Description of the Related Art

In an image forming apparatus such as a printer, a copier, a facsimile, or an integrated machine, in view of the ease of the retrieval of a recording material by a user, an apparatus discharging the recording material, on which an image has been formed, to a front face (front) is suggested. In this apparatus, a sheet discharge tray for loading the discharged recording material is disposed on an upper face portion of the apparatus. Further, a display with a large size display surface having the good readability for the user and with a large size button and the like having the good operability for the user are used as an operation unit, which is operated by the user. This kind of the operation unit is disposed such that an orientation of the display surface of the display is changeable by angle adjustment.

Hitherto, so as to miniaturize the apparatus, the operation unit is disposed such that a part of the operation unit overlaps the sheet discharge tray. Then, so as to simultaneously satisfy the operability of the operation unit and the accessibility to the recording material discharged to the sheet discharge tray, the operation unit is disposed above a discharge locus of the recording material so as not to allow a movable range of operation unit to intersect with the discharge locus of the recording material to the sheet discharge tray (refer to Japanese Patent Laid-Open No. 2015-217551).

Incidentally, sometimes, a curled recording material is discharged to the sheet discharge tray. When the curled recording material abuts onto the operation unit, there is the possibility that the loading capacity of the sheet discharge tray for loading the recording material is decreased due to such as an irregular orientation of the recording material loaded on the sheet discharge tray. Therefore, in the apparatus described in Japanese Patent Laid-Open No. 2015-217551, the operation unit is disposed in a manner greatly separated from the discharge locus so as not to allow the curled recording material to abut onto the operation unit. However, since, in such a case, the operation unit greatly projects upward from the upper face of the apparatus, it is contrary to a request for the miniaturization of the apparatus, and difficult to apply such a configuration.

In view of the problems described above, the purpose of this disclosure is to provide the image forming apparatus that, while ensuring the operability of the operation unit by the user and the accessibility to the recording material discharged to the sheet discharge tray, is capable of achieving the miniaturization of the apparatus.

SUMMARY OF THE INVENTION

According to a first aspect of the present invention, an image forming apparatus includes an image forming unit configured to form an image on a recording material, a casing accommodating the image forming unit, a sheet discharge unit including a first roller and a second roller, wherein the second roller is configured to form a nip portion to nip and convey a recording material by coming into contact with the first roller, and wherein, when viewed in an axial direction of the first roller, a straight line passing through a rotational center of the first roller and a rotational center of the second roller is defined as a first virtual straight line, a straight line orthogonally intersecting with the first virtual straight line is defined as a second virtual straight line, and the sheet discharge unit is configured to discharge a recording material, on which an image is formed by the image forming unit, obliquely upward along the second virtual straight line, a sheet supporting portion disposed at an upper portion of the casing, and including a supporting surface configured to support a recording material discharged by the sheet discharge unit, an operation unit including a display surface, and disposed above the sheet discharge unit in a vertical direction such that a part of the operation unit in a width direction intersecting with the vertical direction and a sheet discharge direction of a recording material overlaps the supporting surface when viewed in the vertical direction, a supporting unit disposed at the upper portion of the casing, and supporting the operation unit in such a manner that, in a state where the display surface is tilted with respect to a horizontal direction, an end on a lower side of the operation unit in the vertical direction is positioned below the second virtual straight line when viewed in the width direction, and a regulating portion disposed between the operation unit and the sheet supporting portion in the vertical direction. The regulating portion is disposed such that, when viewed in the vertical direction, at least a part of the regulating portion overlaps the operation unit and the supporting surface in the width direction. The regulating portion is disposed to intersect with the second virtual straight line when viewed in the width direction. The regulating portion is configured to regulate an obliquely upward movement of a recording material discharged by the sheet discharge unit.

Further features of the present invention will become apparent from the following description of exemplary embodiments with reference to the attached drawings.

DESCRIPTION OF THE EMBODIMENTS

First Embodiment

Image Forming Apparatus

Figure 1:
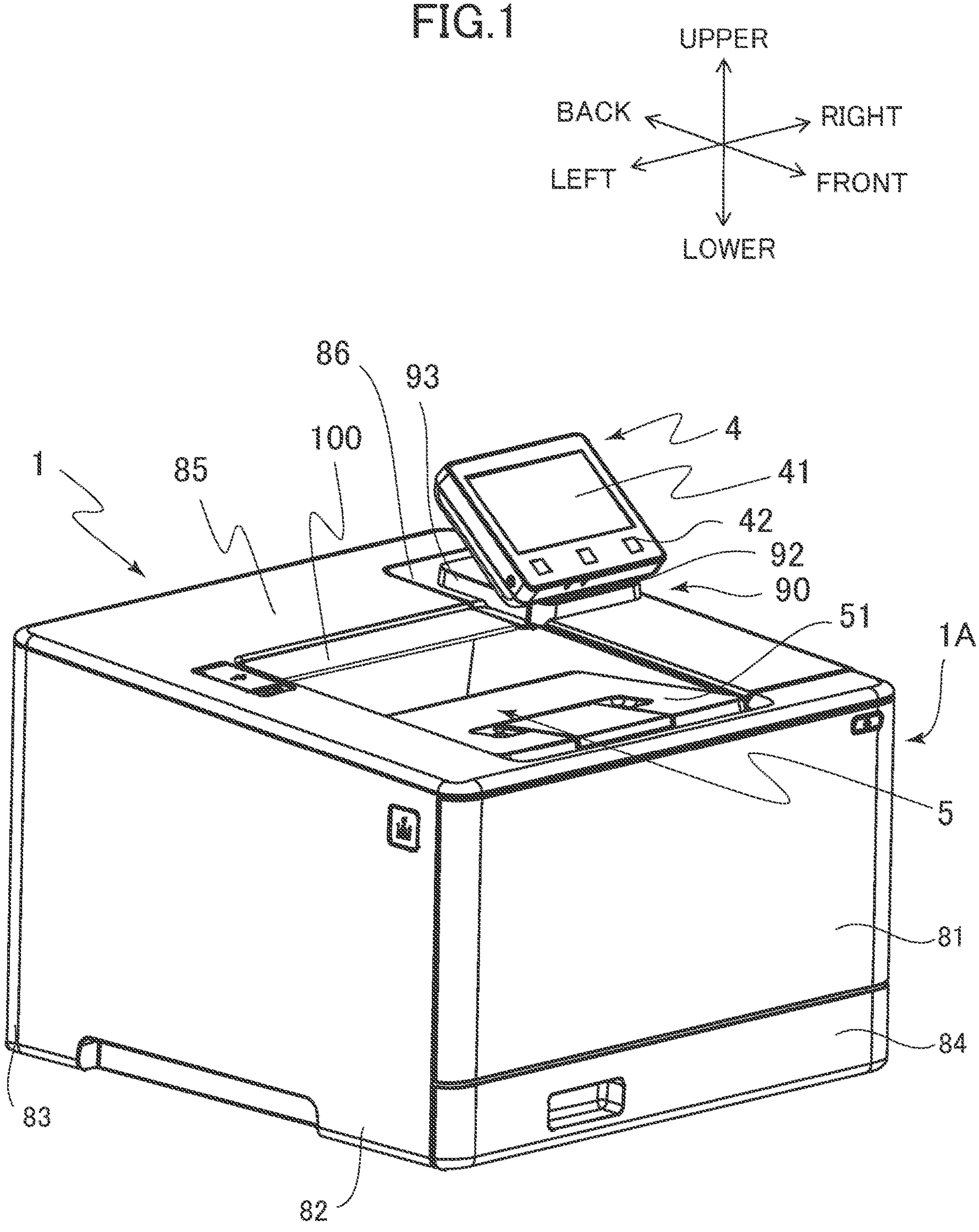
FIG. 1 is a perspective view showing an image forming apparatus of a first embodiment.

Hereinafter, this embodiment will be described. First, using FIGS. 1 and 2, an overview of an image forming apparatus of this embodiment will be described. As shown in FIG. 1, the image forming apparatus 1 of this embodiment, when roughly divided, includes a casing 1A and an operation unit 4, and is the image forming apparatus of an upper face discharge type in which a sheet discharge opening portion 5 for discharging a recording material from the inside of the casing 1A to an upper face of the casing 1A is formed on the upper face portion of the casing 1A. Inside of the space of the sheet discharge opening 5, a sheet discharge tray 51, serving as a sheet supporting portion for loading the recording material discharged from the inside of the casing 1A, is disposed in the sheet discharge opening portion 5. In the image forming apparatus 1 of this embodiment, the recording material on which an image has been formed is discharged from the inside of the casing 1A to the sheet discharge tray 51 in a sheet discharge direction from a back face (back) side toward a front face (front) side. That is, the discharge direction is a direction from the back face side toward the front face side in this description.

To be noted, in this description, a side on which a user stands at the time of operating the operation unit 4 so as to operate the image forming apparatus 1 is referred to as the front face (or front), and the opposite side is referred to as the back face (or back). Further, a right side when viewed from the front face is referred to as right, and a left side when viewed from the front face is referred to as left. Further, an upper side when viewed from the front face is referred to as "upper", and a lower side when viewed from the front face is referred to as "lower". Therefore, in a case of the embodiment shown in FIG. 1, when viewed from the front face, the operation unit 4 is disposed to the right side than the center in the upper side of the casing 1A.

While an illustration is omitted, the casing 1A includes, for example, a left side plate and a right side plate disposed on the left and right sides so as to support each unit and a plurality of sheet metals, such as a stay coupling these left and right side plates to each other, and an outer circumference and the upper face of the casing 1A are covered by an exterior cover configuring the appearance of the image forming apparatus 1. The casing 1A includes a front cover 81 and a cassette cover 84 on the front face side as the exterior cover. As shown in FIG. 1, the front cover 81 is disposed on the upper side of the cassette cover 84 in the vertical direction. The front cover 81 is detachably disposed from the casing 1A, and the cassette cover 84 is provided to a cassette 40 (refer to FIG. 2), described below, and is disposed in a manner integrally withdrawable from the casing 1A with the cassette 40 toward the front face.

Further, the casing 1A includes side face covers 82 respectively covering the left and the right side and a back face cover 83 covering the back face. The side face covers 82 and the back face cover 83 serve as the exterior cover. The side face covers 82 are disposed on both sides in a width direction (left-right direction). Further, the casing 1A includes an upper face cover 85 and a support cover 86, both serving as the exterior cover, and these covers form the upper face (top face), serving as an upper face portion, of the casing 1A. The sheet discharge tray 51 is disposed integrally with the upper face cover 85, and the operation unit 4 is disposed on the support cover 86 via a supporting unit 90. To be noted, it is acceptable that the upper face cover 85 and the support cover 86 are disposed integrally with each other, and, further, is acceptable that the upper face cover 85, the support cover 86, and the sheet discharge tray 51 are disposed integrally with each other. To be noted, each of the covers and the sheet discharge tray 51 described above are made of resin.

Figure 2:
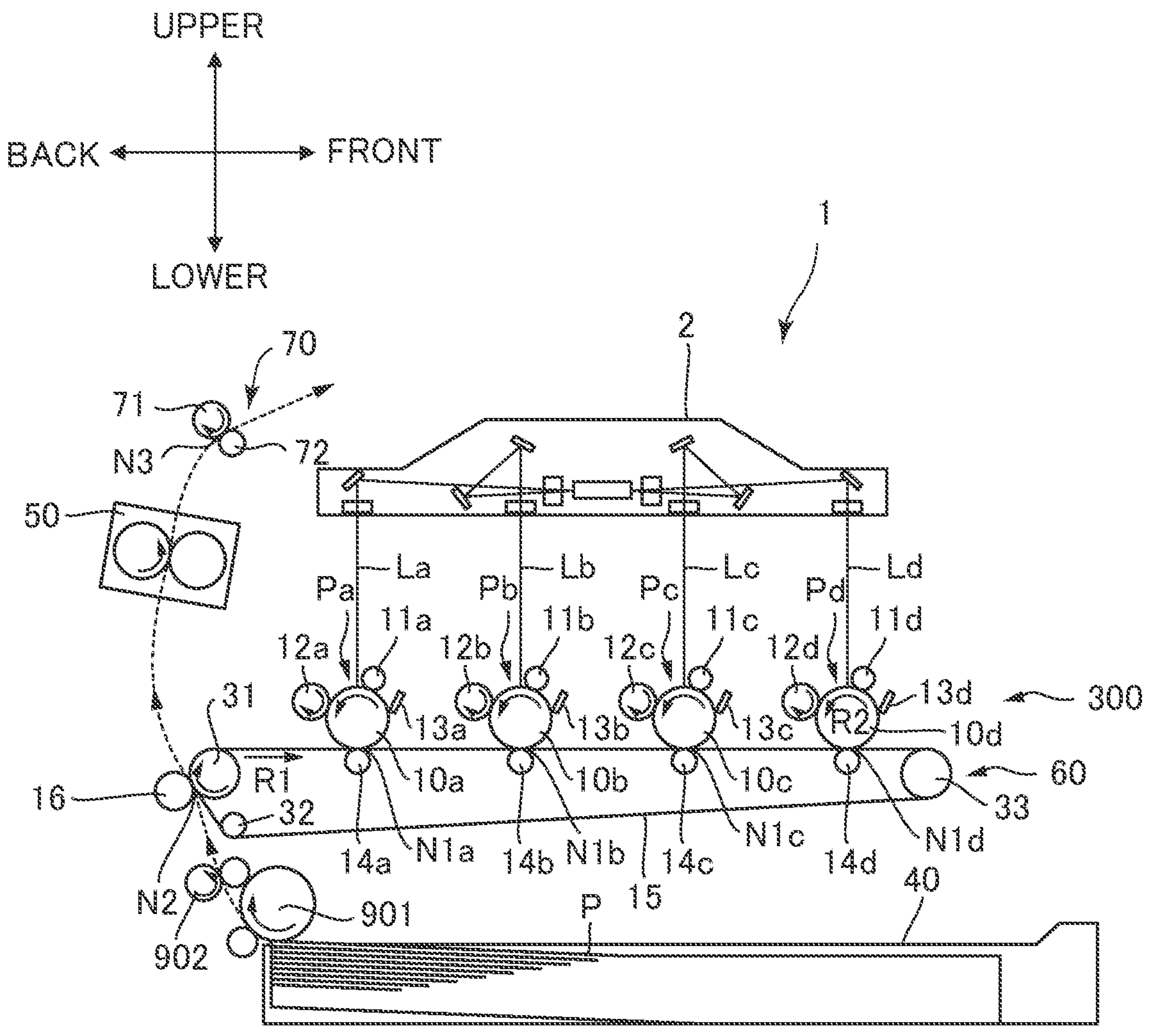
FIG. 2 is a schematic diagram showing a configuration of the image forming apparatus of the first embodiment.

Next, a configuration of the image forming apparatus 1 relating to image formation will be described using FIG. 2. As shown in FIG. 2, the image forming apparatus 1 of this embodiment is a full color printer of an electrophotographic system including image forming units Pa, Pb, Pc, and Pd of yellow, magenta, cyan, and black disposed along an intermediate transfer belt 15. The image forming apparatus 1 receives image information from an external apparatus, not shown, such as a personal computer, and forms a toner image on a recording material P based on the received image information. The recording material P includes various kinds of sheet materials which include paper such as standard paper, cardboard, rough paper, uneven paper, and coated paper, a plastic film, cloth, and the like.

As shown in FIG. 2, in this embodiment, an intermediate transfer unit 60 is disposed under the image forming units Pa to Pd. The intermediate transfer unit 60 is configured such that an endless intermediate transfer belt 15 is moved in an arrow R1 direction by being stretched over a plurality of rollers 31, 32, and 33. A secondary transfer outer roller 16 is disposed in a position facing the roller 31 stretching the intermediate transfer belt 15 across the intermediate transfer belt 15, and forms a secondary transfer nip portion N2 for transferring the toner image borne on the intermediate transfer belt 15 onto the recording material P. The secondary transfer nip portion N2 is a nip portion formed by the roller 31 and the secondary transfer outer roller 16, and, for example, the toner image is transferred onto the recording material P in response to the application of a secondary transfer voltage from a power source, not shown, to the secondary transfer outer roller 16.

A process to form, for example, a full color image of four colors by the image forming apparatus 1 will be described. However, the four image forming units Pa to Pd included in the image forming apparatus 1 are substantially the same in a configuration except for differences in developing colors. Therefore, the image forming unit Pd of black will be described as a representative, and descriptions of the other image forming units Pa to Pc will be omitted herein.

The image forming unit Pd includes a photosensitive drum 10*d*, serving as a photosensitive member. The photosensitive drum 10*d* is rotatably driven in an arrow R2 direction by a drum driving motor, not shown. A charge unit 11*d*, a developing unit 12*d*, a primary transfer roller 14*d*, and a cleaning unit 13*d* are disposed around this photosensitive drum 10*d*.

When an image forming operation has started, at first, a surface of the rotating photosensitive drum 10*d* is uniformly charged by the charge unit 11*d*. Next, the surface of the charged photosensitive drum 10*d* is exposed by a laser beam Ld irradiated from an exposing unit 2 corresponding to an image signal. Thereby, an electrostatic latent image corresponding to the image signal is formed on the photosensitive drum 10*d*. The electrostatic latent image formed on the photosensitive drum 10*d* is developed to the toner image with the developer stored inside of the developing unit 12*d*. In a case of this embodiment, one single exposing unit 2 is disposed above the image forming units Pa to Pd, and a plurality of photosensitive drums 10*a* to 10*d* are exposed only by the one single exposing unit 2. That is, the one single exposing unit 2 is shared by the image forming units Pa to Pd for exposure.

The toner image formed on the photosensitive drum 10*d* is primarily transferred onto the intermediate transfer belt 15 in a primary transfer nip portion N1*d* formed with the primary transfer roller 14*d* disposed across the intermediate transfer belt 15. At this time, a primary transfer voltage is applied from a power source, not shown, to the primary transfer roller 14*d*. The intermediate transfer belt 15 bears and conveys the toner image transferred from the photosensitive drum 10*d*. To be noted, an adhering matter such as a toner remained on the surface of the photosensitive drum 10*d* after the primary transfer is collected by the cleaning unit 13*d*.

The image forming units Pa to Pd of yellow, magenta, cyan, and black perform these operations in sequence, and superimpose the toner images of the four colors on the intermediate transfer belt 15. Thereafter, the recording material P stored in the cassette 40 is conveyed to the secondary transfer nip portion N2 in the timing synchronizing with the formation of the toner image.

The cassette 40 is disposed in the lower side of the casing 1A, and is capable of storing a large number of sheets of the recording material P. A sheet feed roller 901 feeds the recording material P from the cassette 40 toward a registration roller 902 one sheet at a time. The registration roller 902 corrects the skew of the recording material P, and conveys the recording material P to the secondary transfer nip portion N2 synchronously with the toner image on the intermediate transfer belt 15. Then, in response to the application of the secondary transfer voltage from a power source, not shown, to the secondary transfer outer roller 16, the toner image on the intermediate transfer belt 15 is secondarily transferred onto the recording material P.

The recording material P onto which the toner image has been secondarily transferred is conveyed to a fixing unit 50. The fixing unit 50, while conveying the recording material P, heats and presses the recording material P, and fixes the toner image on the relevant recording material P The recording material P on which the toner image has been fixed by the fixing unit 50 is conveyed upward (i.e., vertical conveyance), and, by being discharged toward the front face from the inside of the casing 1A to the outside by a sheet discharge unit 70, is loaded on the sheet discharge tray 51 (refer to FIG. 1). The sheet discharge unit 70 includes a first roller 71 and a second roller 72, and the first and second rollers 71 and 72 form a sheet discharge nip portion N3 capable of nipping and conveying the recording material P by coming into contact with each other. To be noted, in this embodiment, when viewed in an axial direction of the first roller 71 (i.e., left-right direction), the sheet discharge unit 70 discharges the recording material P from the inside of the casing 1A obliquely upward toward a direction along a second straight line 202 serving as a second virtual line orthogonally intersecting with a first straight line 201 serving as a first virtual line passing through a rotation center of the first roller 71 and a rotation center of the second roller 72 (refer to FIG. 5 described below). The recording material P discharged obliquely upward is discharged toward the direction from the back face (back) side to the front face (front) side by the own weight of the recording material P.

To be noted, in this embodiment, the image forming units Pa to Pd, the intermediate transfer unit 60, the secondary transfer outer roller 16, and the like described above are included in an image formation unit 300 which forms the toner image on the recording material P. Further, the exposing unit 2, the image formation unit 300, the fixing unit 50, the sheet feed roller 901, the registration roller 902, the sheet discharge unit 70, and the cassette 40 described above are housed inside of the casing 1A (refer to FIG. 1).

Operation Unit

Next, with reference to FIG. 1, the operation unit 4 will be described using FIGS. 3 to 6. As understood by referring to FIG. 1, the operation unit 4 which the user operates for operating the image forming apparatus 1 is disposed on the casing 1A in a manner capable of facing the front face. The operation unit 4 includes a large size display 41 (for example, a 3 to 6 inches liquid crystal monitor and the like) for improving the readability for the user and an input unit 42 in which the size of a button, a switch, and the like is enlarged for improving the operability for the user. To be noted, as the display 41, it is acceptable to use a touch panel, which allows an operation similar to the input unit 42, such as, for example, the input of an image forming job and the selection of the recording material P, in response to a touch operation of the user on a screen.

The operation unit 4 is disposed on the casing 1A such that it is possible to variably tilt and adjust an orientation of a display surface of the display 41 vertically around an axis in the left-right direction (a width direction intersecting with the vertical direction and the sheet discharge direction of the recording material P). The operation unit 4 is disposed in a manner pivotable to an arbitrary tilt angle (for example, zero to forty degrees) with respect to the horizontal direction so as to meet a sight line height of a broad range of users, for example, from a tall user to a user sitting in a wheelchair. FIG. 1 shows a case where the operation unit 4 is in an elevated surface position by being pivoted to a maximum tilt angle.

Supporting Unit

Figure 4:
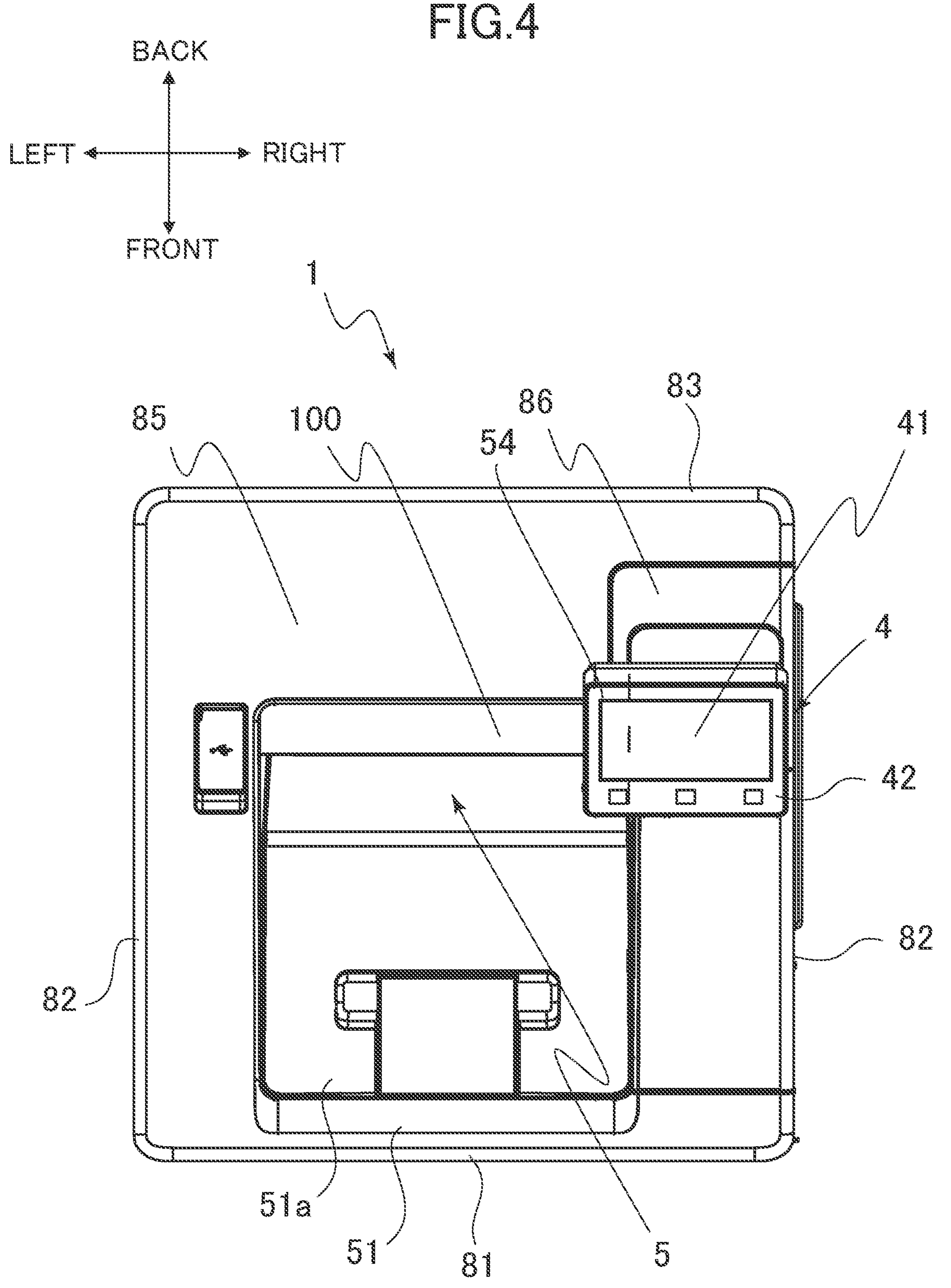
FIG. 4 is a top view showing the image forming apparatus of the first embodiment.

In a case where the user adjusts the angle of the operation unit 4 in accordance with the sight line height within a range from the minimum tilt angle of zero degree to the maximum tilt angle of forty degrees, the user can grasp and pivot the operation unit 4. So as to allow the user to perform such an operation, as shown in FIG. 4, the operation unit 4 is supported by a supporting unit 90 whose angle is freely adjustable.

As shown in FIG. 1, the supporting unit 90 includes a fixing portion 93 and a pivot holding portion 92. The fixing portion 93 secures the operation unit 4 to the casing 1A via a pivot holding portion 92. The pivot holding portion 92 pivotably holds the operation unit 4 with respect to the operation unit fixing portion 93. While an illustration is omitted, a free stop hinge holding the pivot holding portion 92 at an arbitrary angle by friction is disposed in the pivot holding portion 92. While there are several types of the free stop hinges, for example, a pipe type, in which a metallic shaft is press fitted into a resin pipe, and the like are acceptable.

The supporting unit 90 pivotably support the operation unit 4 by changing the angle of the display surface of the display 41 in the vertical direction between a first position (substantially horizontal position), where the angle of the display surface of the display 41 becomes the minimum tilt angle with respect to the horizontal direction, and a second position (elevated surface position), where the angle of the display surface of the display 41 becomes the maximum tilt angle with respect to the horizontal direction. To be noted, in this description, using the horizontal direction, which is zero degree, as a reference, the substantially horizontal position of the operation unit 4 includes a position where the operation unit 4 substantially tilts within five degrees from the horizontal direction (that is, −5 degrees to +5 degrees).

Disposition of Operation Unit

Figure 3:
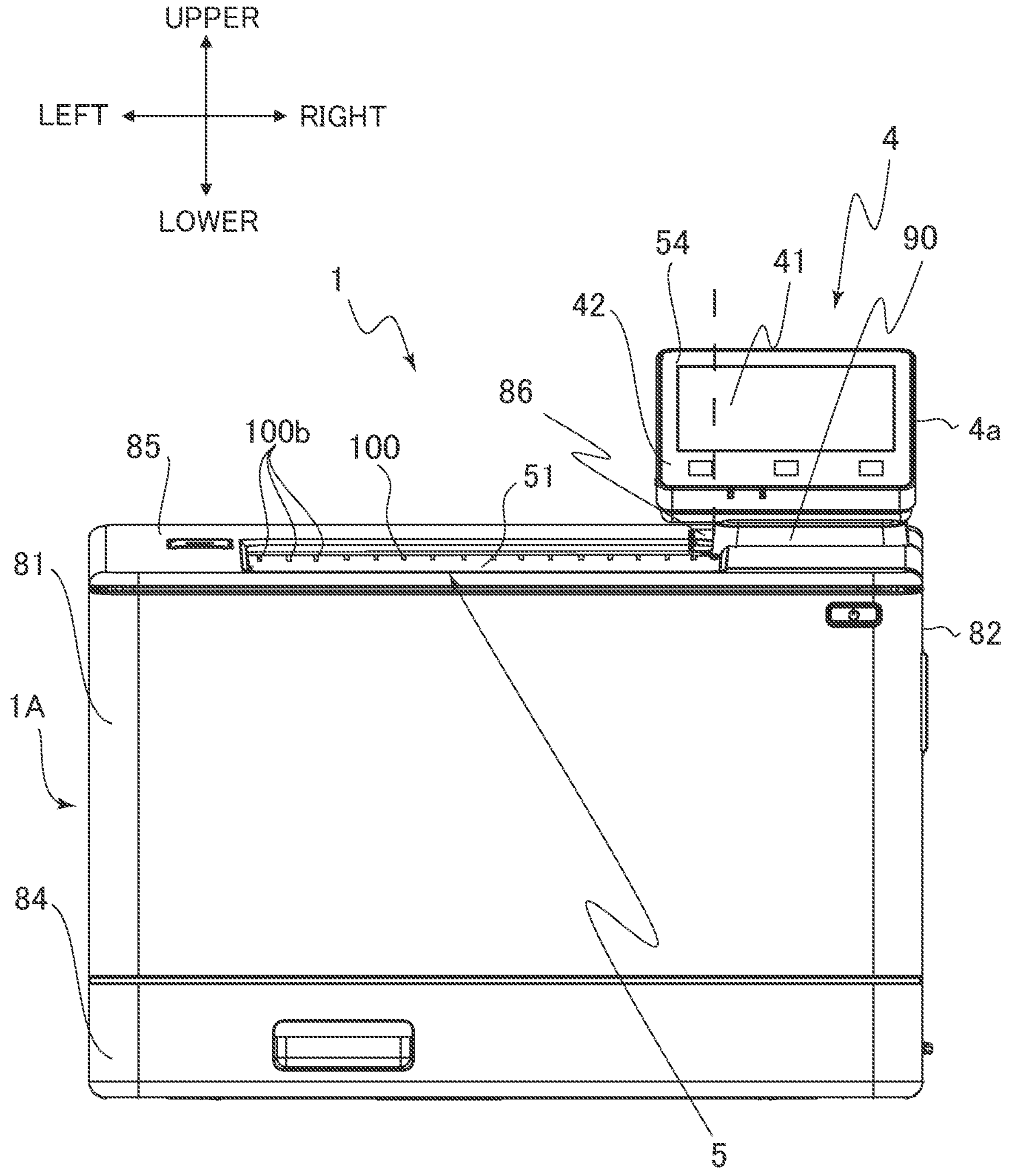
FIG. 3 is a front view showing the image forming apparatus of the first embodiment.

Next, the disposition of the operation unit 4 in the left-right direction will be described. As shown in FIGS. 3 and 4, the sheet discharge opening portion 5 is formed on the upper portion of the casing 1A and opens to the front face of the image forming apparatus 1, and the sheet discharge tray 51 is disposed in this sheet discharge opening portion 5. As shown in FIG. 3, the user can retrieve the recording material P loaded on the sheet discharge tray 51 from the space of the sheet discharge opening portion 5 surrounded by the upper face cover 85 and the sheet discharge tray 51.

In this embodiment, for achieving the miniaturization of the image forming apparatus 1 in the left-right direction, as shown in FIGS. 3 and 4, the operation unit 4 is disposed so as not to project from a wall surface of the side face cover 82 on the right side of the image forming apparatus 1. That is, the operation unit 4 is positioned inside of both sides of the casing 1A in the width direction. However, in such a case, since the operation unit 4 is formed in a large size, a part (hereinafter referred to as a projection portion 54) of the operation unit 4 overlaps a loading surface 51*a*, serving as a supporting surface, of the sheet discharge tray 51 in the left-right direction. To be noted, the supporting unit 90 is disposed so as not to overlap the sheet discharge tray 51 in the left-right direction.

Figure 9:
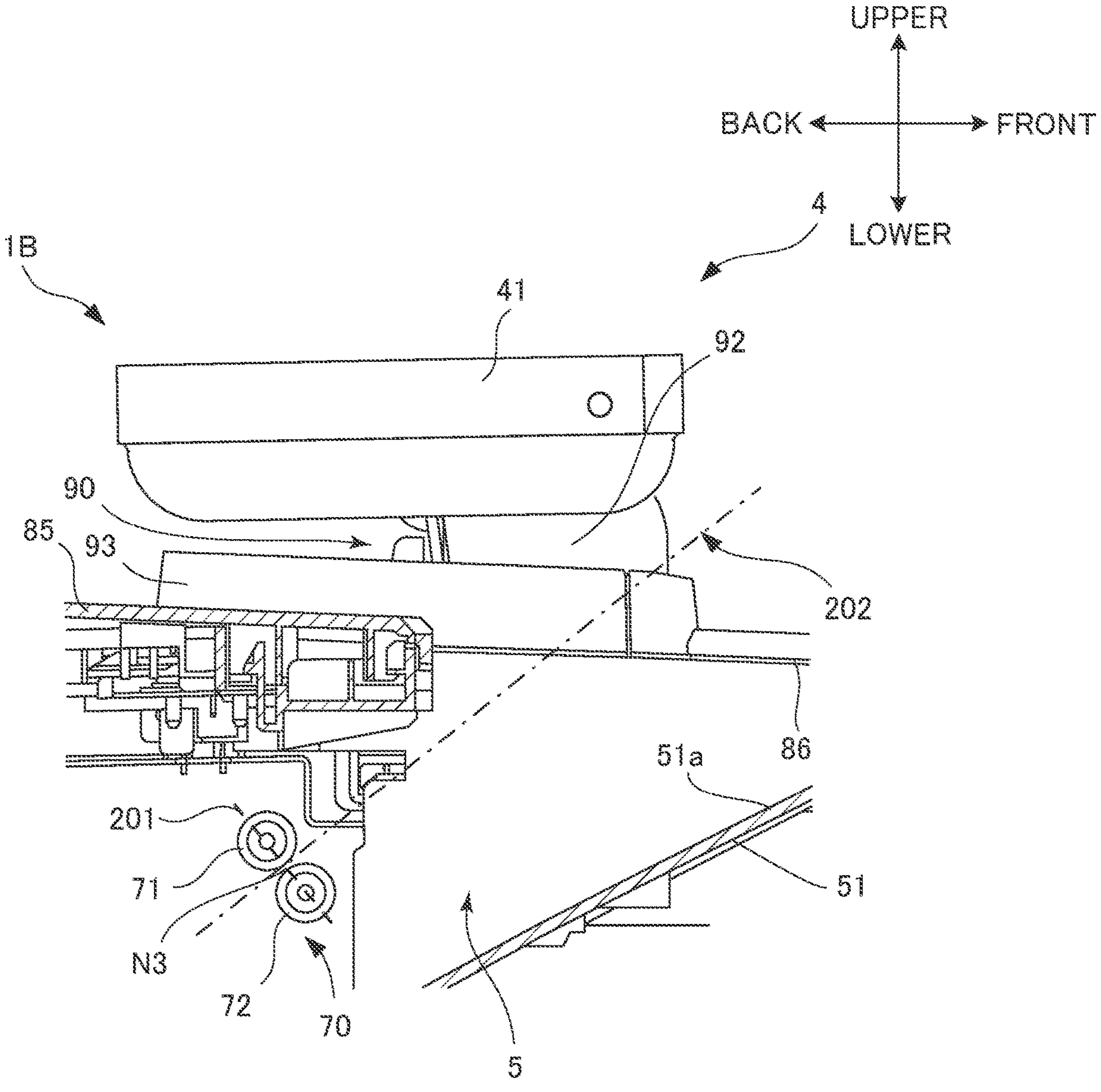
FIG. 9 is a side view showing, in an enlarged manner, the operation unit in a case where the operation unit is positioned in the substantially horizontal position in a comparative example.
Figure 10:
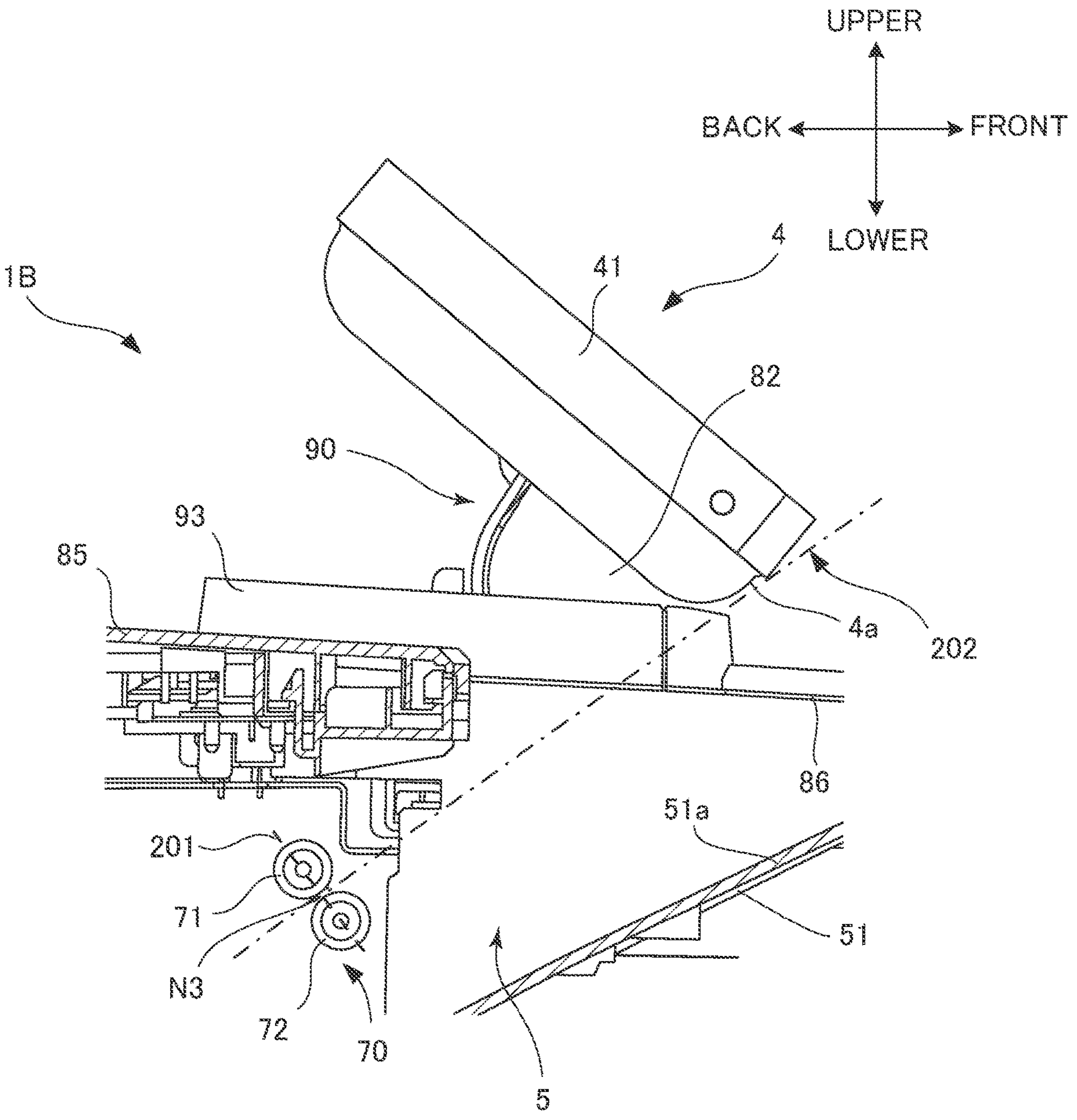
FIG. 10 is a side view showing, in an enlarged manner, the operation unit in a case where the operation unit is positioned in the elevated surface position in the comparative example.

Next, the disposition of the operation unit 4 in an upper-lower direction (vertical direction) will be described by referring to a comparative example. The comparative example is shown in FIGS. 9 and 10. FIG. 9 is a side view showing, in an enlarged manner, the operation unit 4 in a case where the operation unit 4 is positioned in the substantially horizontal position in the comparative example, and FIG. 10 is a side view showing, in an enlarged manner, the operation unit 4 in a case where the operation unit 4 is positioned in the elevated surface position in the comparative example.

So as to achieve the miniaturization of the image forming apparatus 1 in the upper-lower direction, it is desirable that the operation unit 4 is disposed as low as possible with respect to the vertical direction. However, since the projection portion 54 of the operation unit 4 overlaps the loading surface 51*a* of the sheet discharge tray 51 in the left-right direction as described above, in a case where the operation unit 4 is disposed in the lower position, there is the possibility that the recording material P abuts onto the operation unit 4 (in particular, the projection portion 54) at the time of discharging the recording material P to the sheet discharge tray 51. In the comparative example, the operation unit 4 is disposed in a position where the discharged recording material P does not abut onto the projection portion 54.

As shown in FIGS. 9 and 10, in the comparative example, in both of the substantially horizontal position and the elevated surface position, a part of the operation unit 4 in the vertical direction is not positioned below the second straight line 202. That is, when the operation unit 4 is positioned in the elevated surface position, a first end 4*a* on a lower side of the operation unit 4 in the vertical direction is not positioned below the second straight line 202, and, further, when the operation unit 4 pivots between the substantially horizontal position and the elevated surface position, a pivot locus drawn by the first end 4*a* does not intersect with the second straight line 202 and is generated above the second straight line 202. In other words, the operation unit 4 is disposed above a discharge locus of the recording material P to the sheet discharge tray 51 so as not to allow a movable area of the operation unit 4 to intersect with the discharge locus of the recording material P. Therefore, when the recording material P is discharged to the sheet discharge tray 51 by the sheet discharge unit 70, the recording material P does not come into contact with the operation unit 4. To be noted, a part of the operation unit 4 is disposed downstream of the sheet discharge unit 70 with respect to the sheet discharge direction.

However, in the comparative example, since, in a case where the recording material P is curled and discharged, the curled recording material P sometimes abuts onto the operation unit 4, so as to prevent this, the operation unit 4 is positioned in a position where the operation unit 4 is separated further upward from the second straight line 202 in comparison with a position shown in FIG. 9 or 10. However, since such a configuration is contrary to the miniaturization of the image forming apparatus 1 in the upper-lower direction and is not suitable for achieving the miniaturization, the application of such a configuration is difficult.

Figure 5:
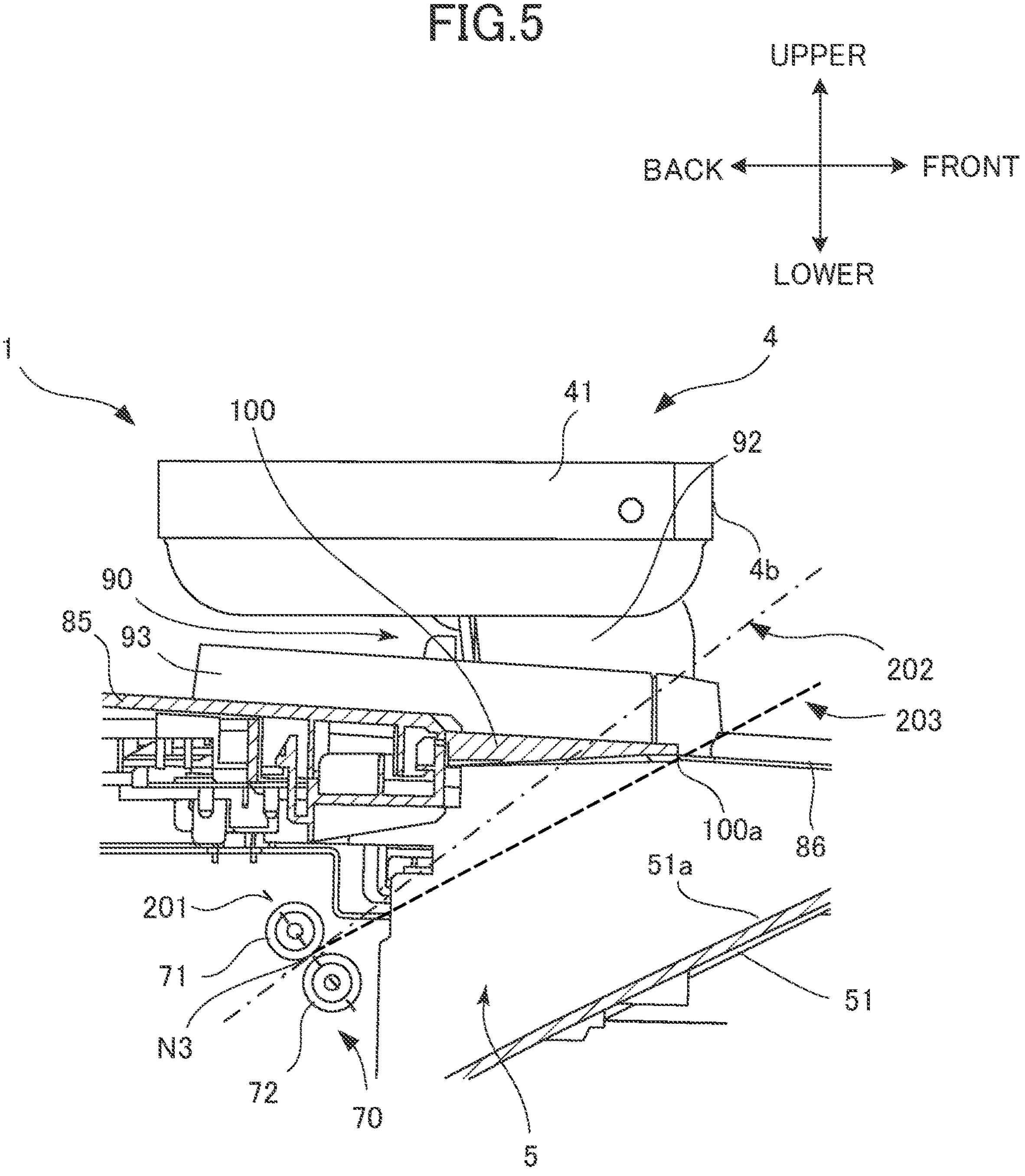
FIG. 5 is a side view showing, in an enlarged manner, an operation unit in a case where the operation unit is positioned in a substantially horizontal position.
Figure 6:
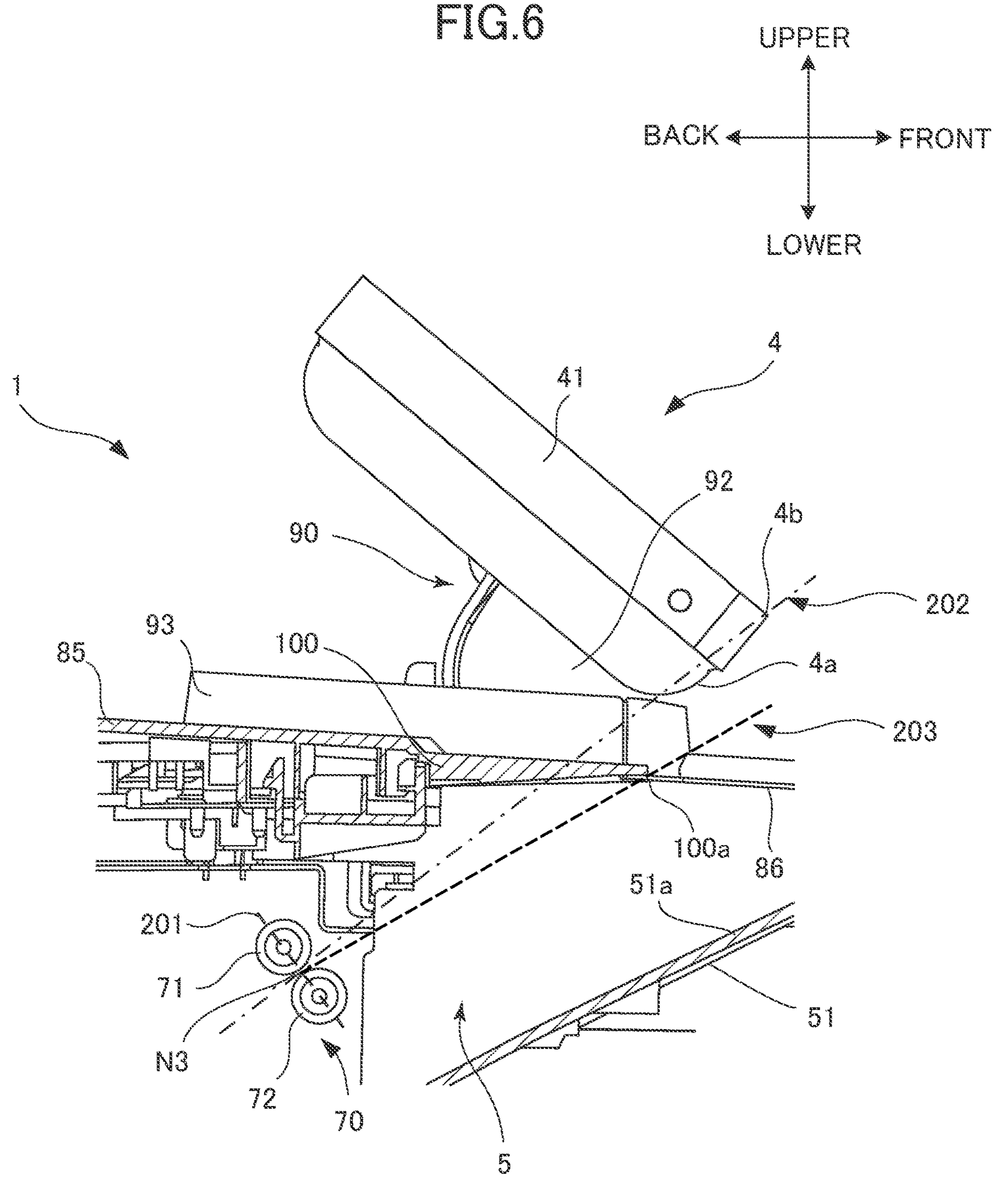
FIG. 6 is a side view showing, in an enlarged manner, the operation unit in a case where the operation unit is positioned in an elevated surface position.

Also in this embodiment, a part of the operation unit 4 is disposed downstream of the sheet discharge unit 70 with respect to the sheet discharge direction. Then, in this embodiment, so as to achieve the miniaturization of the image forming apparatus 1 in the upper-lower direction, as shown in FIGS. 5 and 6, a part of the operation unit 4 is positioned below the second straight line 202 at least at the time when the operation unit 4 is positioned in the elevated surface position. That is, the first end 4*a* on the lower side in the vertical direction at the time when the operation unit 4 is positioned in the elevated surface position is positioned below the second straight line 202, and the pivot locus drawn by the first end 4*a* at the time when the operation unit 4 pivots between the elevated surface position and the substantially horizontal position intersects with the second straight line 202. In other words, the operation unit 4 is disposed below a position where the movable area of the operation unit 4 intersects with the discharge locus of the recording material P to the sheet discharge tray 51. As described above, the operation unit 4 is supported by the supporting unit 90 such that, in a state where the display surface of the display 41 is tilted with respect to the horizontal direction, the first end 4*a* is positioned, when viewed in the left-right direction, below the second straight line 202. Thereby, while ensuring the operability of the operation unit 4 by the user and the accessibility to the recording material P discharged to the sheet discharge tray 51, it is possible to miniaturize the apparatus.

However, then, there is the possibility that, as described above, when the recording material P is discharged to the sheet discharge tray 51 by the sheet discharge unit 70, for example, the curled recording material P abuts onto the operation unit 4 (in particular, the projection portion 54). Therefore, in this embodiment, a sheet discharge guide 100, serving as a regulating portion, is disposed so as not to allow the recording material P to abut onto the operation unit 4 even if the recording material P is curled. The sheet discharge guide 100 will be described as follows.

Sheet Discharge Guide

As understood from FIGS. 3 and 4, the sheet discharge guide 100 is disposed to the upper face cover 85. In a case of this embodiment, the sheet discharge guide 100 is disposed between the operation unit 4 and the sheet discharge tray 51 with respect to the vertical direction, and formed over the whole width of the sheet discharge tray 51 with respect to the left-right direction. Therefore, when viewed in the vertical direction, at least a part of the sheet discharge guide 100 in the left-right direction overlaps the projection portion 54 of the operation unit 4 and the loading surface 51*a* of the sheet discharge tray 51.

To be noted, as shown in FIG. 3, it is preferred that a plurality of ribs 100*b* extending in the sheet discharge direction with a gap between the ribs 100*b* in the left-right direction are disposed on a surface facing the sheet discharge tray 51 (in particular, the loading surface 51*a*) of the sheet discharge guide 100. This is because, by the disposition of the rib 100*b*, a contact area between the discharged recording material P and the sheet discharge guide 100 is decreased and the recording material P becomes less likely to stick to the sheet discharge guide 100 by static electricity. With this configuration, the recording material P is discharged smoothly.

As shown in FIGS. 5 and 6, the sheet discharge guide 100 extends from the upper face cover 85 so as to, when viewed in the left-right direction, intersect with the second straight line 202 described above and so as to position a downstream end 100*a* downstream of the second straight line 202 with respect to the sheet discharge direction. That is, the sheet discharge guide 100 is disposed such that a third straight line 203 connecting the sheet discharge nip portion N3 and the downstream end 100*a* is positioned below the second straight line 202 with respect to the vertical direction.

As described above, in this embodiment, at least at the time when the operation unit 4 is positioned in the elevated surface position, the operation unit 4 is disposed such that a part of the operation unit 4 is positioned below the second straight line 202. In response to this, the sheet discharge guide 100 is disposed such that, at least at the time when the operation unit 4 is positioned in the elevated surface position, a part of the operation unit 4 is positioned above the third straight line 203. In this embodiment, whole of the operation unit 4 is positioned above the third straight line 203. That is, the first end 4*a*, at the time when the operation unit 4 is positioned in the elevated surface position, on the lower side of the operation unit 4 in the vertical direction is positioned above the third straight line 203, and the pivot locus drawn by the first end 4*a* at the time when the operation unit 4 pivots between the elevated surface position and the substantially horizontal position does not intersect with the third straight line 203. In other words, the sheet discharge guide 100 is disposed such that the movable area of the operation unit 4 does not intersect with the third straight line 203.

However, it is preferred to form the sheet discharge guide 100 such that the downstream end 100*a* is positioned upstream of a downstream end 4*b* of the operation unit 4 with respect to the sheet discharge direction. This is for a purpose of preventing the sheet discharge guide 100 from decreasing a number of sheets loadable on the sheet discharge tray 51 in a case where, similar to this embodiment, the sheet discharge tray 51 is disposed in a state where the loading surface 51*a* is tilted so as to position a downstream side of the loading surface 51*a* in the sheet discharge direction above an upstream side with respect to the vertical direction. That is, if the sheet discharge guide 100 is formed such that the downstream end 100*a* is positioned downstream of the downstream end 4*b* of the operation unit 4, a gap between the sheet discharge guide 100 and the loading surface 51*a* of the sheet discharge tray 51 becomes narrower toward a downstream side, and it becomes difficult to load a desired number of sheets on the sheet discharge tray 51.

To be noted, in the case of this embodiment, it is acceptable to form the sheet discharge guide 100 integrally with the upper face cover 85. For example, it is acceptable to form the sheet discharge guide 100 such that a part of the upper face cover 85 extends in the sheet discharge direction so as to, when viewed in the vertical direction, cover part of the sheet discharge tray 51 in the sheet discharge opening portion 5.

As described above, in this embodiment, the sheet discharge guide 100 is disposed to the upper face cover 85. The sheet discharge guide 100 is disposed between the operation unit 4 and the sheet discharge tray 51 with respect to the vertical direction, and formed over the whole width of the sheet discharge tray 51 with respect to the left-right direction. Further, the sheet discharge guide 100 extends from the upper face cover 85 such that the downstream end 100*a* is positioned downstream of the second straight line 202 with respect to the sheet discharge direction. By disposing the sheet discharge guide 100 as described above, the recording material P discharged from the sheet discharge unit 70 is, even if curled, guided to the sheet discharge tray 51 without abutting onto the operation unit 4 (in particular, the projection portion 54), but by abutting onto the sheet discharge guide 100. Therefore, without greatly separating the operation unit 4 upward so as not to allow the recording material P to abut onto the operation unit 4, it is possible to dispose the operation unit 4 more downward in the vertical direction. Thereby, while ensuring the operability of the operation unit 4 and the accessibility to the recording material P discharged to the sheet discharge tray 51 by the user, it is possible to miniaturize the apparatus.

Further, if the recording material P abuts onto the operation unit 4, there is the possibility that the loading capacity of the sheet discharge tray 51 is changed depending on the tilt angle of the operation unit 4 due to a change in a sheet discharge orientation of the recording material P. However, according to this embodiment, the sheet discharge orientation of the recording material P becomes less likely to change since the recording material P abuts onto the sheet discharge guide 100. Therefore, it is possible to suppress a decrease in the loading capacity of the sheet discharge tray 51.

Second Embodiment

Figure 7:
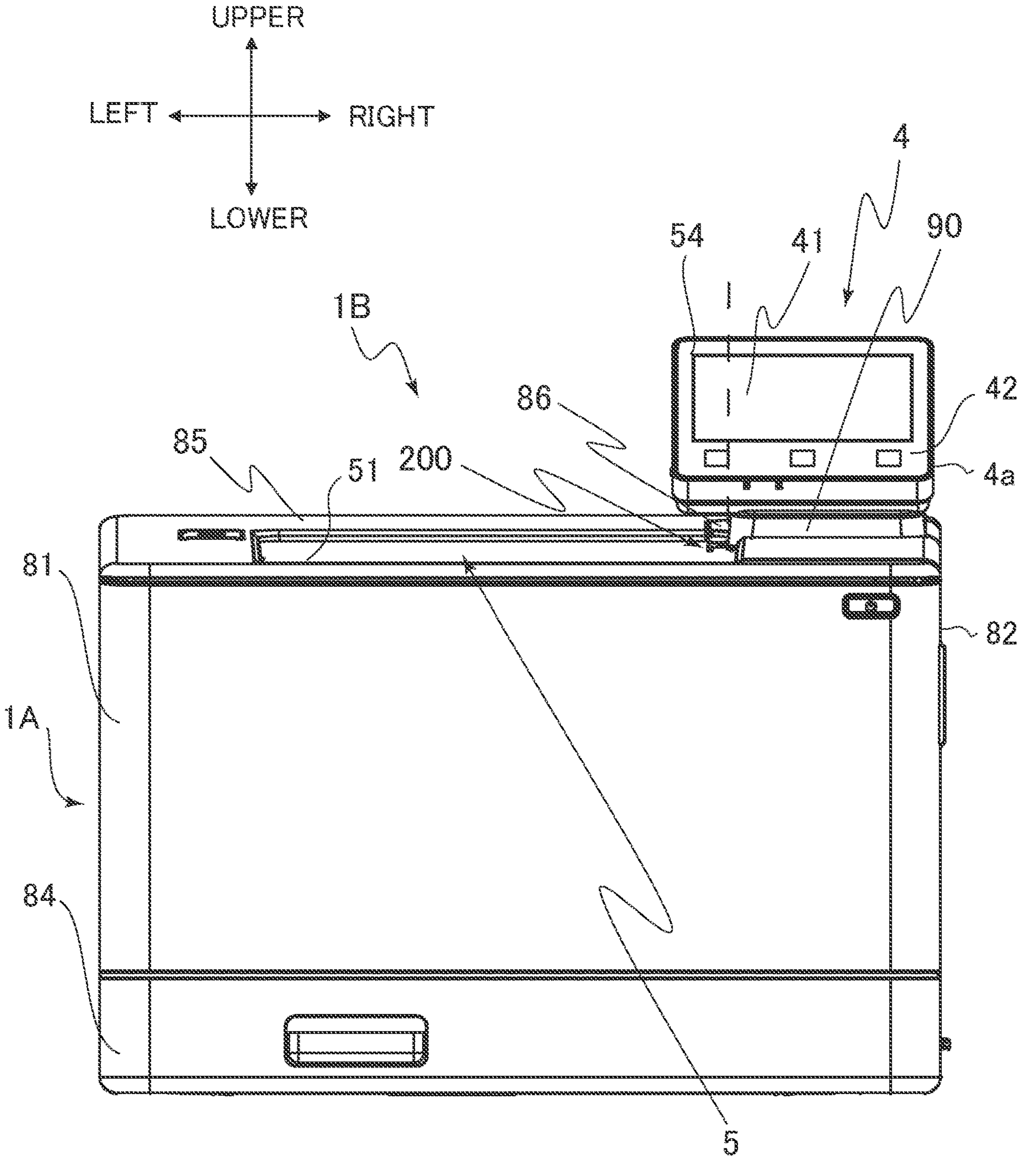
FIG. 7 is a front view showing an image forming apparatus of a second embodiment.
Figure 8:
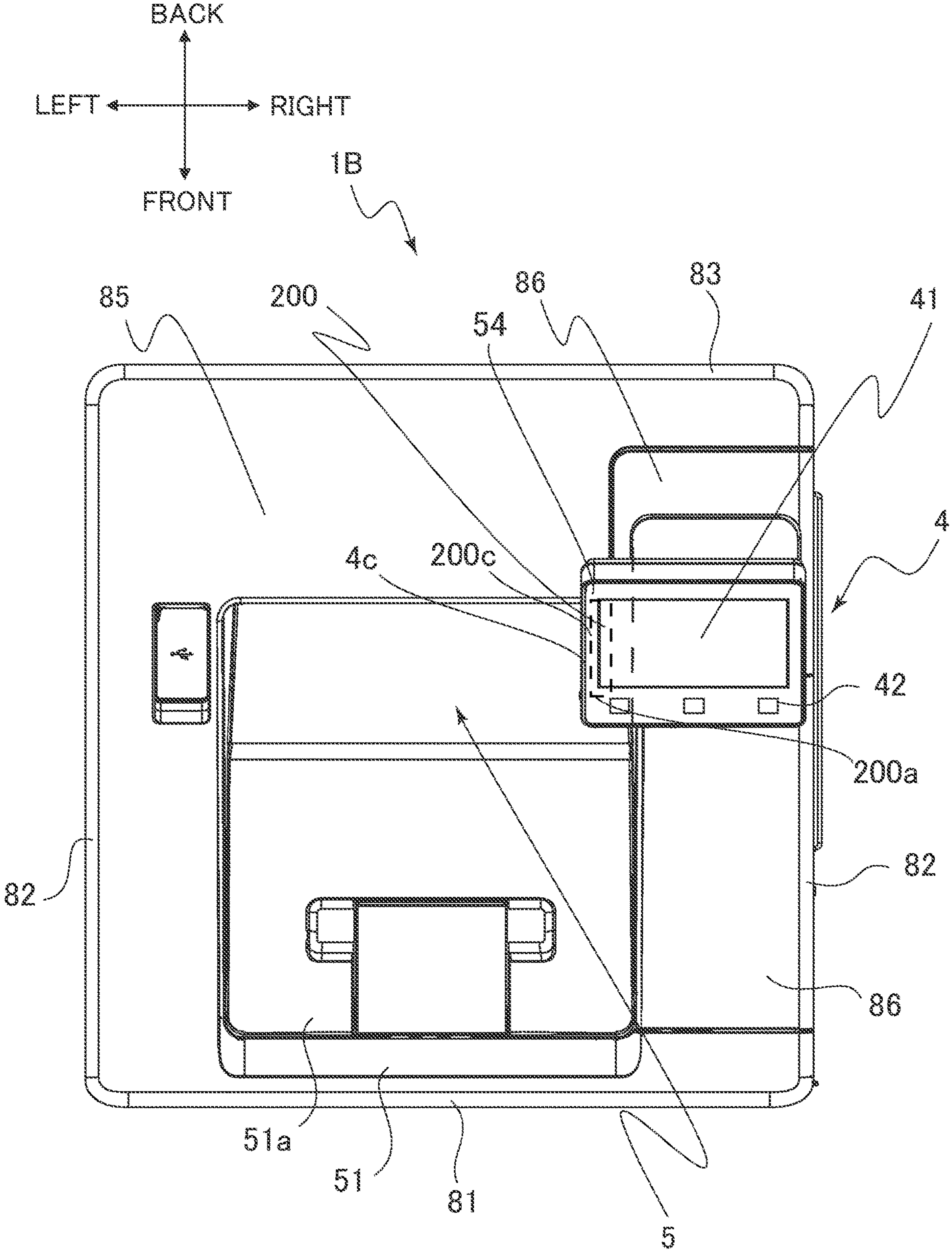
FIG. 8 is a top view showing the image forming apparatus of the second embodiment.

Next, a second embodiment will be described using FIGS. 7 and 8. FIG. 7 is a front view showing an image forming apparatus 1B of the second embodiment. FIG. 8 is a top view showing the image forming apparatus 1B of the second embodiment. To be noted, in comparison with the first embodiment, the second embodiment is different from the first embodiment at a point where a sheet discharge guide 200 is disposed to the support cover 86, and it is acceptable that the second embodiment is similar to the first embodiment in other configurations. Therefore, by putting the same reference characters on configurations similar to the first embodiment in FIGS. 7 and 8, descriptions will be simplified or omitted herein.

As shown in FIGS. 7 and 8, in the second embodiment, the sheet discharge guide 200, serving as the regulating portion, is disposed to the support cover 86. It is acceptable to form the sheet discharge guide 200 integrally with the support cover 86. In this embodiment, the sheet discharge guide 200 is disposed between the operation unit 4 and the sheet discharge tray 51 with respect to the vertical direction, and disposed in an area overlapping the projection portion 54 of the operation unit 4 with respect to the left-right direction. As shown in FIG. 8, the sheet discharge guide 200 is disposed to the support cover 86 such that, with respect to the left-right direction of the casing 1A, an end 200*c* on the left side of the sheet discharge guide 200 is positioned rightward of an end 4*c* on the left side of the operation unit 4.

A configuration of the sheet discharge guide 200 in the sheet discharge direction is similar to the sheet discharge guide 100 in the first embodiment described above. That is, when viewed in the left-right direction, the sheet discharge guide 200 intersects with the second straight line 202 (refer to FIG. 6), and extends along the support cover 86 such that a downstream end 200*a* is positioned downstream of the second straight line 202 with respect to the sheet discharge direction. In a case of the second embodiment, the sheet discharge guide 200 is disposed such that the movable area of the operation unit 4 does not intersect with a straight line connecting the sheet discharge nip portion N3 (refer to FIG. 6) and the downstream end 200*a*.

By disposing the sheet discharge guide 200 as described above, the recording material P discharged from the sheet discharge unit 70 is, even if curled, guided to the sheet discharge tray 51 without abutting onto the operation unit 4 (in particular, the projection portion 54), but by abutting onto the sheet discharge guide 200. Therefore, without greatly separating the operation unit 4 upward so as not to allow the recording material P to abut onto the operation unit 4, it is possible to dispose the operation unit 4 more downward in the vertical direction. Thereby, while ensuring the operability of the operation unit 4 and the accessibility to the recording material P discharged to the sheet discharge tray 51 by the user, it is possible to miniaturize the apparatus.

Further, as described above, since the sheet discharge guide 200 is disposed such that the end 200*c* on the left side of the sheet discharge guide 200 is positioned rightward of the end 4*c* on the left side of the operation unit 4, it is possible to improve the operability for the user at the time of changing the angle of the operation unit 4.

To be noted, while, in the embodiment described above, a case where the operation unit 4 is pivotable is described as an example, it is not limited to this, and this embodiment can be also applied to a case where the operation unit 4 is fixed (i.e., immovable) in the elevated surface position.

To be noted, the embodiments described above are not limited to the image forming apparatus of the electrophotographic system forming the toner image on the recording material by using the developer containing the toner and a carrier, and it is acceptable to apply the embodiments to an image forming apparatus of the other system. For example, it is possible to apply the embodiments to an image forming apparatus of such as an ink jet system which forms the image by ejecting an ink to the recording material.

By this disclosure, while ensuring the operability of the operation unit and the accessibility to the recording material discharged to the sheet discharge tray by the user, it is possible to achieve to miniaturize the apparatus by the simple configuration.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-182381, filed Nov. 9, 2021 which is hereby incorporated by reference herein in its entirety.

What is claimed is:

1. An image forming apparatus comprising:

an image forming unit configured to form an image on a recording material;

a casing accommodating the image forming unit;

a sheet discharge unit including a first roller and a second roller, wherein the second roller is configured to form a nip portion to nip and convey a recording material by coming into contact with the first roller, and wherein, when viewed in an axial direction of the first roller, a straight line passing through a rotational center of the first roller and a rotational center of the second roller is defined as a first virtual straight line, a straight line orthogonally intersecting with the first virtual straight line is defined as a second virtual straight line, and the sheet discharge unit is configured to discharge a recording material, on which an image is formed by the image forming unit, obliquely upward along the second virtual straight line;

a sheet supporting portion disposed at an upper portion of the casing, and including a supporting surface configured to support a recording material discharged by the sheet discharge unit;

an operation unit including a display surface, and disposed above the sheet discharge unit in a vertical direction such that a part of the operation unit in a width direction intersecting with the vertical direction and a sheet discharge direction of a recording material overlaps the supporting surface when viewed in the vertical direction;

a supporting unit disposed at the upper portion of the casing, and supporting the operation unit in such a manner that, in a state where the display surface is tilted with respect to a horizontal direction, an end on a lower side of the operation unit in the vertical direction is positioned below the second virtual straight line when viewed in the width direction; and a regulating portion disposed between the operation unit and the sheet supporting portion in the vertical direction, wherein the regulating portion is disposed such that, when viewed in the vertical direction, at least a part of the regulating portion overlaps the operation unit and the supporting surface in the width direction, wherein the regulating portion is disposed to intersect with the second virtual straight line when viewed in the width direction, and wherein the regulating portion is configured to regulate an obliquely upward movement of a recording material discharged by the sheet discharge unit.

2. The image forming apparatus according to claim 1, wherein the supporting unit is configured to rotatably support the operation unit between a first position and a second position, and wherein the first position is a position where a tilt angle of the display surface becomes a minimum tilt angle with respect to the horizontal direction, and the second position is a position where the tilt angle of the display surface becomes a maximum tilt angle with respect to the horizontal direction.

3. The image forming apparatus according to claim 1, wherein the regulating portion is disposed such that, with respect to the sheet discharge direction, an end on a downstream side of the regulating portion is positioned upstream of an end on a downstream side of the operation unit.

4. The image forming apparatus according to claim 1, wherein the regulating portion is disposed over a whole width of the supporting surface in the width direction.

5. The image forming apparatus according to claim 4, wherein the casing includes an upper face cover disposed at an upper part of the casing and forming an upper face portion of the casing, and wherein the regulating portion is formed integrally with the upper face cover.

6. The image forming apparatus according to claim 1, wherein the regulating portion is disposed in an area in which a whole width of the regulating portion overlaps the operation unit in the width direction when viewed in the vertical direction.

7. The image forming apparatus according to claim 6, wherein the casing includes an upper face cover and a support cover, wherein the upper face cover is disposed at an upper part of the casing and forms an upper face portion of the casing, wherein the support cover is disposed at an upper part of the casing and forms the upper face portion of the casing with the upper face cover, wherein the supporting unit is disposed on the support cover, and wherein the regulating portion is formed integrally with the support cover.

8. The image forming apparatus according to claim 1, wherein the operation unit is disposed inside of both sides of the casing in the width direction.

9. The image forming apparatus according to claim 8, wherein the casing includes side face covers on the both sides of the casing in the width direction, and wherein the operation unit is disposed between two of the side face covers in the width direction.

* * * * *